UNITED STATES PATENT OFFICE.

GEORGE A. FOWLER, OF PHILADELPHIA, PENNSYLVANIA.

TEMPORARY STOPPING FOR TEETH.

SPECIFICATION forming part of Letters Patent No. 254,205, dated February 28, 1882.

Application filed November 28, 1881. (Specimens.)

*To all whom it may concern:*

Be it known that I, GEORGE A. FOWLER, a citizen of the United States, residing in the city of Philadelphia, in the county of Philadelphia and State of Pennsylvania, have invented a new and useful composition of matter to be used for the purpose of retaining in teeth the various medicaments used for their treatment, which composition is known as "Fowler's Temporary Stopping," of which the following is a specification.

My composition consists of the following ingredients, combined substantially in the proportions stated: wax, four parts; oxide of zinc, fifteen parts; gutta-percha, (refined white,) eight parts; chalk or whiting, six parts. These ingredients are to be melted and mixed and molded in pencil or stick form.

The proportions of the powders used in this composition may be varied.

It has been found by experience that different qualities and kinds of gutta-percha require the use of different proportions of the powders in the composition, and consequently of the wax, to give the most satisfactory results. I do not therefore wish strictly to confine my invention to the formula given, as I am aware that it may vary and still produce practical results, and that it may be prudent to use for different purposes other qualities and kinds of gutta-percha than that specified in the given formula.

I am aware that other compounds with gutta-percha as an ingredient have been used as a temporary stopping for carious teeth; but there have been difficulties incident to the use of all these compounds, and I claim that I am the first person who has practically overcome these difficulties, and the first to produce an article that fully and perfectly meets all the requirements of the case.

The one fault that has been universal with all other plastic temporary stoppings has been the shrinking of the compound after it has been introduced into the tooth and during the process of cooling and hardening, which permits leakage and a consequent "clouding" of the filled tooth.

It has been scientifically demonstrated that my compound makes an absolutely tight filling. It also adheres firmly to the surface of the tooth when warmed and applied thereto, and hence entirely does away with the necessity of making "under-cuts." This property of adhesion and the fact that it does not shrink in cooling and hardening make this compound useful for underlaying other fillings to prevent leakage or discoloration, and for the same reasons it gives perfect control over the medicaments used in the treatment of teeth.

In using the above-described stopping, one end of the stick should be warmed until the composition becomes sufficiently plastic, when it is applied directly to the tooth and worked into the cavity with warm or cold instruments, as indicated.

What I claim as my invention, and desire to secure by Letters Patent of the United States, is—

1. The hereinbefore-described composition of matter to be used as a temporary stopping for teeth, consisting of wax, gutta percha, oxide of zinc, and chalk or whiting, in the proportions as set forth.

2. The hereinbefore-described composition of matter, molded in a pencil or stick form for convenience in using the same.

GEO. A. FOWLER.

Witnesses:
 THEO. T. SCOTT,
 JOHN E. ROBERTS.